(12) United States Patent
Fukuzawa

(10) Patent No.: US 6,563,647 B2
(45) Date of Patent: May 13, 2003

(54) ROD LENS ARRAY

(75) Inventor: Takashi Fukuzawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/829,983

(22) Filed: Apr. 11, 2001

(65) Prior Publication Data

US 2001/0033434 A1 Oct. 25, 2001

(30) Foreign Application Priority Data

Apr. 12, 2000 (JP) .......................... 2000-111257

(51) Int. Cl.[7] .............................. G02B 27/10; G02B 7/02
(52) U.S. Cl. ..................... 359/620; 359/619; 359/811
(58) Field of Search ............................. 359/811, 819, 359/619, 621, 622, 623, 620; 250/586, 208.1, 227.11, 227.2; 362/581, 551, 554, 556, 559; 355/1

(56) References Cited

U.S. PATENT DOCUMENTS

| | | | | |
|---|---|---|---|---|
| 5,500,523 | A | * 3/1996 | Hamanaka | 250/216 |
| 5,896,162 | A | * 4/1999 | Taniguchi | 347/244 |
| 6,239,421 | B1 | * 5/2001 | Nagata et al. | 250/208.1 |
| 2001/0040620 | A1 | * 11/2001 | Wakisaka et al. | 347/263 |

FOREIGN PATENT DOCUMENTS

| | | | |
|---|---|---|---|
| JP | 10-039769 | * | 2/1998 |
| JP | 86116130 | | 7/1999 |

OTHER PUBLICATIONS

Taiwan application 090108751 with English translation dated Oct. 23, 2002.

* cited by examiner

*Primary Examiner*—Georgia Epps
*Assistant Examiner*—William Choi
(74) *Attorney, Agent, or Firm*—Whitham, Curtis & Christofferson, P.C.

(57) ABSTRACT

A rod lens array has a construction in which a number of rod-shaped lens elements are arrayed in at least one row between two side plates, and the clearances are filled with resin to form a single integral unit. Two side plates are formed of glass plates, the surfaces of these two glass plates facing the lens elements are flat and smooth, the outer surfaces on the opposite sides are formed with reflection-preventing portions, the side surfaces of both of the glass plates on the beam-exit side are formed with beam-shielding zones from the outer edges inwardly along almost the whole length. The width of the light-tight zone $T_s$ satisfies the relation;

$$Tg > Ts > Tg - Z \times D \times \{2 + \sqrt{3} \times (n-1)\} / \{2 \times (TC-Z)\},$$

where $Tg$ is a thickness of the glass plate, $D$ is a diameter of lens element, $Z$ is a length of lens element, $TC$ is a conjugate length, and $n$: number of columns of lens element. The glass plate may be made thinner instead of providing a light-tight zone.

9 Claims, 2 Drawing Sheets

ROD LENS ARRAY

BACKGROUND OF THE INVENTION

The present invention relates to a rod lens array in which a number of rod-shaped lens elements are arrayed in at least one row between two side plates, and clearances between the side plates and the rod-shaped lens elements are filled with resin to form a single integral unit. More specifically, the present invention relates to a rod lens array in which a glass plate is used as a side plate to improve the array accuracy (the alignment) of the lens elements using the flatness and smoothness of the glass side plate to thereby enhance resolution.

The rod lens array is a beam converging lens component of rectangular shape in which a number of refractive index rod-shaped lens elements each having a refractive-index distribution in the radial direction are arrayed in parallel in at least one row between two side plates disposed in parallel at a distance, and clearances between the side plates and the lens elements are impregnatingly filled with black silicone resin to form one continuous erected image of the same magnification as overlapping images respectively formed by the adjacent lens elements. Since the optical path is short, and the reversing mirror is not necessary, the use of a rod lens array can make apparatus small in size. For this reason, the rod lens array is widely used in a scanning optical system of a facsimile machine, a printer, etc.

The side plate is made of a black material that does not allow the beam to pass therethrough, because of the following reasons:

(1) it is necessary to render the coefficient of thermal expansion to be close to that of the lens material in order to prevent disorder of the array of the lens elements during heat process after the impregnation with resin;

(2) it is necessary to render the grindability to be close to that of lens material since the side plate and the lens elements are simultaneously ground;

(3) it is required to eliminate beam that pass through the portion other than the lens in order to maintain the resolution.

In general, fiber reinforced plastic (hereinafter referred to as FRD) is used, and specifically, a glass-cloth based epoxy resin laminated plate is used.

With ever-increasing miniaturization, sophistication, improvement in functionality, and drop in price of electronic equipment, the rod lens array used for an optical scanning system is also required to be miniaturized and thus the lens element is decreasing in diameter, and the requirement for optical performance of the rod lens array is also increasing.

In such increasing miniaturization, sophistication, and improvement in functionality, recently, occurrence of slight irregularities in alignment of the lens elements has been taken as a problem. Such slight irregularities in alignment of the lens elements cause periodic variations in resolution along the length of the rod lens array, and accordingly, a phenomenon of periodic variations in density occurs when it is used in a reading system/writing system for half tone processing.

From a study of the cause of such slight irregularities in alignment of the lens elements in the rod lens array of the related art, it was found to be periodical corrugations existing on the surface of the FRP corresponding to the arrangement of fiber bundles. Under the circumstances, when glass plates having preferable smoothness are used for side plates as a trial, it was certainly recognized that the irregularities in alignment of the lens element could be prevented. For example, when the positions of the lens elements were measured at the position 4 mm axially away therefrom, and the amounts of displacement were obtained for a hundred and forty lens elements, the standard deviation of displacement in the direction of alignment of the lens elements were 0.67 $\mu$m when the FRP plates were used as the side plates, and 0.31 $\mu$m when the glass plates were used.

However, there was still a problem remained in that it cannot put into actual use because resolution is lowered depending on beam transmitted through the glass plates. The MTF (Modulation Transfer Function) that is an indicator of resolution of the lens array can be expressed by the equation:

$$MTF=(I\max-I\min)/(I\max+I\min)\times 100$$

where I max is a maximum value and I min is a minimum value of the intensity I obtained when reading a monochrome pattern. Therefore, since beam transmitted through the glass increases the value of I min, resolution is accordingly lowered.

SUMMARY OF THE INVENTION

Accordingly, an object of the present invention is to provide a rod lens array adapted to increase the accuracy of alignment of the lens elements at low cost and to prevent lowering of resolution. Another object of the present invention is to provide a rod lens array mounting body in which the accuracy of alignment of the lens elements can be increased and lowering of resolution can be prevented.

The present invention is a rod lens array in which a number of rod-shaped lens elements are arrayed in at least one row between two side plates, and the clearances are filled with resin to form a single integral unit. In the present invention, two side plates are formed of glass plates, the inner surfaces of these two glass plates facing the lens elements are flat and smooth, the outer surfaces on the opposite sides are formed with reflection-preventing portions, the side surfaces of both of the glass plates on the beam-exit side are formed with beam-shielding zones from the outer edges inwardly along almost the whole length, and the width of the beam-shielding zone Ts satisfies the following relation:

$$Tg>Ts>Tg-Z\times D\times\{2+\sqrt{3}\times(n-1)\}/\{2\times(TC-Z)\},$$

where:
Tg: thickness of the glass plate
D: diameter of lens element
Z: length of lens element
TC: conjugate length (face-to-face dimension of the object image)
n: number of columns of lens element.

Instead of the construction in which the beam-shielding zone is provided, the thickness of both of the glass plates Tg may be decreased as:

$$Tg>Z\times D\times\{2+\sqrt{3}\times(n-1)\}/\{2\times(TC-Z)\}.$$

In the present invention, "reflection-preventing portion" means a processed layer for preventing reflection from occurring to the extent that little reflection is assumed to occur on the outer surface of the glass plate, or a processed layer that causes a scattering of light. In the construction described above the reflection-preventing portion includes an anti-reflection coating layer formed on the outer surface of the glass plate, a rough surface formed with fine pits and projections, or a refractive index matching portion.

As described thus far, it is preferable to subject the glass plate to be used as a side plate to anti-reflection processing in itself. However, anti-reflection processing may be applied to a holder member that is to be brought into contact with the glass plate, or when joining them together. Alternatively, a beam-shielding zone may be formed by the use of the holder member that covers the glass plate instead of forming a beam-shielding zone on the glass plate in itself.

The present disclosure relates to the subject matter contained in Japanese patent application No. 2000-111257 (filed on Apr. 12, 2000), which is expressly incorporated herein by reference in its entirety.

DESCRIPTION OF THE PREFERRED EMBODIMENT

Figure 1A:
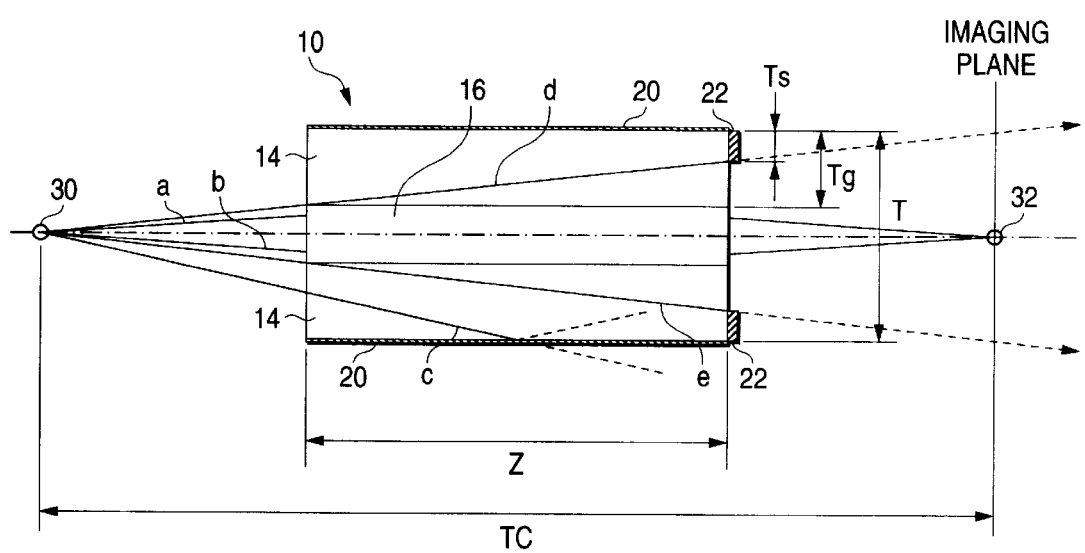
FIGS. 1A and 1B are explanatory drawings showing an embodiment of the rod lens array according to the present invention.
Figure 1B:
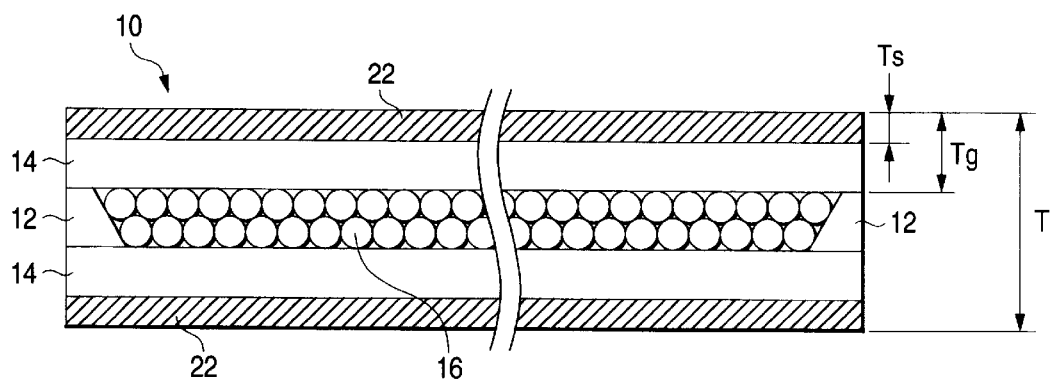

FIGS. 1A and 1B are explanatory drawings showing an embodiment of the rod lens array according to the present invention, in which FIG. 1A shows an optical path taken along the cross section in parallel with the end surface of the rod lens array, and FIG. 1B shows a beam emitting surface. The rod lens array 10 has a rectangular construction in which a number of rod-shaped lens elements 16 are arrayed in parallel in at least one row (in FIG. 1B, two rows are closely provided) between the two side plates 14 disposed in parallel at a distance with a spacer 12 interposed therebetween. Black silicone resin is impregnatingly filled in the clearance between the side plates and the lens elements to join them together. Such a rod lens array is generally produced by the steps of arranging and interposing a number of rods between two large flat plates, joining them as a single unit to obtain an intermediate assembly, cutting it into rectangular strips, and grinding the end surfaces.

Each lens element 16 is constructed as a gradient index rod lens having a parabolic refractive-index distribution in the radial direction formed by ion exchange/diffusion of the glass rod, and the diameter thereof is about 0.1–1.5 mm. In the present invention, the above-described two side plates 14 are formed of glass plates. The surfaces of these two glass plates 14 facing the lens elements are flat and smooth (the state of normal glass plate), and the outer surfaces on the opposite sides are formed with reflection-preventing portions 20. The reflection-preventing portion is a processed layer for preventing reflection from occurring to the extent that little reflection is assumed to occur on the outer surface of the glass plate, or a processed layer that causes a scattering of beam. The reflection-preventing portion 20 of this embodiment maybe formed with an anti-reflection coating layer or the refractive index matching portion on the outer surface of the glass plate to prevent reflection from occurring on the outer surface, or with fine pits and projection to obtain a rough surface to cause a scattering of light.

In addition, in this embodiment, both of the glass plates are formed with beam-shielding zones (light-blocking zones) 22 of a constant width of Ts from the outer edges inwardly along almost the whole length (at least the length of array of lens elements) of the side surfaces on the sides where the beam is emitted. The width of the beam-shielding zone (light-blocking zone) Ts is determined to satisfy the following relation:

$$Tg > Ts \times Tg - Z \times D \times \{2 + \sqrt{3} \times (n-1)\} / \{2 \times (TC-Z)\}.$$

where:
Tg: thickness of the glass plate
D: diameter of lens element
Z: length of lens element
TC: conjugate length (face-to-face dimension of the object image)
n: number of rows of lens element. In this embodiment shown in FIG. 1B, the number of rows of the lens element n is n=2.

As described above, the rod lens array obtained by cutting a large intermediate assembly into rectangular strips is fixed with a jig and subjected to grinding on its end surface so as to obtain a prescribed length of lens. The beam-shielding zone 22 is formed by applying black paint, for example, by printing after the end surfaces are ground. The width Ts of the beam-shielding zone 22 may be any value as far as it is larger than $Tg - Z \times D \times \{2 + \sqrt{3} \times (n-1)\} / \{2 \times (TC-Z)\}$, and may also be formed on the entire side surface of the glass plate.

The beam from the beam Source (a point beam source or a line beam source in parallel with rod lenses) 30 emitted into the lens elements 16 (shown by signs a and b in the figure) is propagated through the lens elements 16 and focuses at an imaging point 32. However, as described above, beam emitted from the beam source 30 into the glass plate and directed toward the outer surface of the glass plate (shown by the sign c) is transmitted or diffused due to the reflection-preventing portion 20 formed on the outer surface of the glass plate, and thus it does not reach the imaging point 32. Beam from the beam source 30 entered into the glass plate and directed to the end surface thereof on the beam-exit side (shown by signs d and e) is blocked by the beam-shielding zone 22 and thus it does not come out to the beam-exit side. As a result, no light is transmitted through the glass plate, and thus the minimum value of intensity I min does not increase, thereby preventing resolution from lowering.

In the present invention, since the inner surfaces of the glass plates (surfaces facing the lens elements) are flat and smooth, irregularity of alignment of the lens elements at the time of manufacturing can be restrained to a minimum, thereby decreasing variations in resolution.

Figure 2:
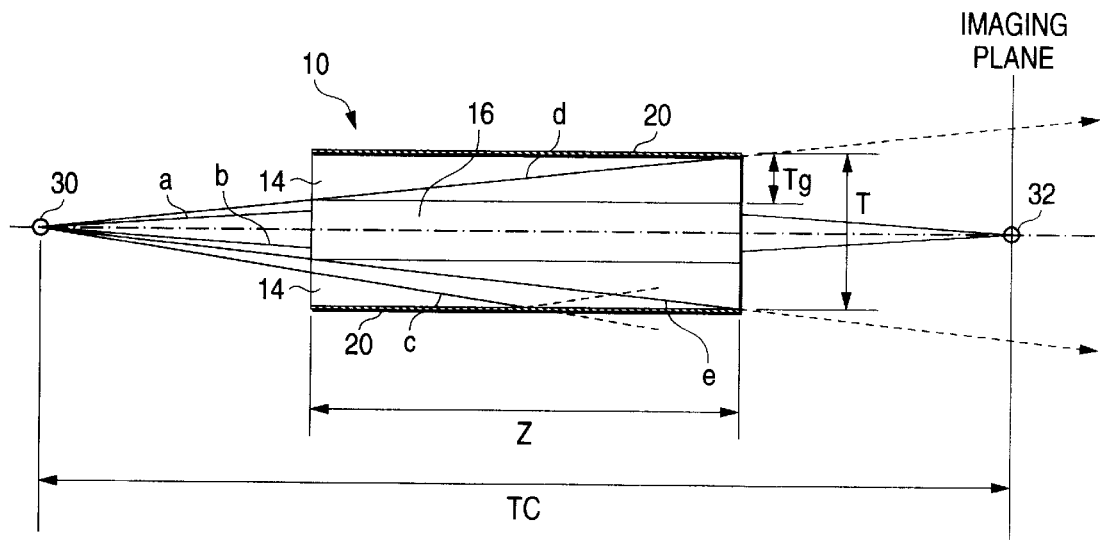
FIG. 2 is another explanatory drawing showing another embodiment according to the present invention.

FIG. 2 is an explanatory drawing showing another embodiment of the rod lens according to the present invention. Since the construction of the rod lens array is basically the same as the embodiment shown above, the identical signs and numerals are given to the corresponding parts, and the description thereof is omitted. In this embodiment, both of the side plates 14 are formed of glass plates, and reflection-preventing portions 20 are formed on the outer surfaces on the opposite sides of the surfaces facing toward the lens elements. In this embodiment, the thickness Tg of the glass plate in itself is formed as thin as it satisfies the relation of:

$$Tg > Z \times D \times \{2 + \sqrt{3} \times (n-1)\} / \{2 \times (TC-Z)\}.$$

and the beam-shielding zone shown in conjunction with the previous embodiment is not formed in this embodiment.

Beam from the beam source (a point beam source or a line beam source in parallel with rod lenses) 30 emitted into the lens elements 16 (shown by signs a and b in the figure) is focused at the imaging point 32. However, as described above, beam emitted from the beam source 30 into the glass plate and directed toward the outer surface of the glass plate (shown by the sign c) is transmitted or diffused due to the reflection-preventing portion 20 formed on the outer surface of the glass plate, and thus it does not reach the imaging point 32. Beam emitted from the beam source 30, entered into the glass plate, and directly came out from the end surface of the glass plate on the beam-exit side (shown by the signs d and e) does not exist. In other words, beam passing through the glass plate does not come out to the beam-exit side.

The present invention provides a preferable construction, since it is not necessary to print beam-shielding zones on the side surfaces of the glass plates on the beam-exit side, and thus the printing process can be omitted under the conditions where the sufficient mechanical strength can be given to the glass plate.

Though it is not shown, in the construction in which unnecessary outgoing light is prevented by decreasing the thickness of the glass plate as in this embodiment, there may be the case where the mechanical strength is not sufficient. In such a case, the mechanical strength can be enhanced by combining it with other members. For example, by adhering an enforcing material such as a FRP or a metal plate on the side plate, irregularities in alignment of the lens elements can be restrained to the minimum level by the flatness and smoothness of the inner surfaces of the glass plates, beam passing through the glass plate and coming out from the beam-exit side thereof can be prevented by limiting the thickness of the glass plate, and the mechanical strength can be established by the reinforcing material. By employing a reinforcing material for the mounting member on the side of the equipment on which the rod lens array of the present invention is to be mounted, mounting on the equipment and reinforcing of the glass plate can be achieved simultaneously.

Figure 3:
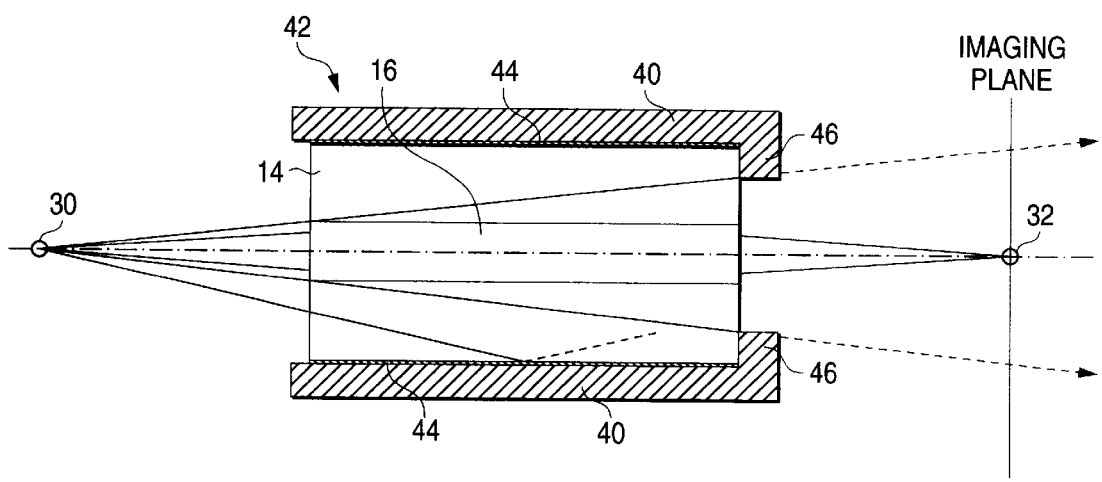
FIG. 3 is an explanatory drawing showing an embodiment of the rod lens array mounting body according to the present invention.

FIG. 3 is an explanatory drawing showing an embodiment of the rod lens array mounting body according to the present invention. The rod lens array 10 has a rectangular construction in which a number of rod-shaped lens elements 16 are arrayed in parallel in at least one row between two side plates 14 disposed in parallel at a distance with a spacer interposed therebetween, and the clearances are impregnated and filled with black silicone resin to obtain a single integral unit. The rod lens array mounting body 42 is constructed by combining the rod lens array 10 and holder members 40 that is to be brought into contact with the side plates of the rod lens array 10.

In this embodiment as well, two side plates 14 are formed of glass plates, of which the surfaces facing the lens elements are flat and smooth, and reflection-preventing portions 44 are formed at the portion where the glass plate and the holder member 40 abuts. The reflection-preventing portion 44 is preferably formed on the glass plate. However, it is also possible to form the reflection-preventing portion by making the inner surface of the holder member black and rough. Alternatively, such a reflection-preventing performance can be added by interposing black resin between the holder member and the glass plate when they are fixed with each other. The beam-shielding zones 46 are formed on the holder member 40 in such a manner that they overhang along the whole length from the outer edges inwardly on the beam-exit sides of both of the glass plates. The width Ts of the light-tight zone 46 is adapted to satisfy the relation:

$$Tg > Ts \times Tg - Z \times D \times \{2 + \sqrt{3} \times (n-1)\} / \{2 \times (TC-Z)\}$$

When the thickness of the glass plate Tg is as thin as it satisfies the relation:

$$Tg > Z \times D \times \{2 + \sqrt{3} \times (n-1)\} / \{2 \times (TC-Z)\},$$

the above-described light-tight zone is not necessary.

As is described above, the restraint of reflection may be performed on the glass plate and on the holder member that comes into contact with the glass plate. It is also possible to add such a function when fixing the holder member to the glass late. When forming beam-shielding zones, the beam-shielding film may be adhered on the glass plate, or the beam-shielding zones may be formed according to the configuration and construction of the holder member.

According to the present invention, since glass plates are used as side plates of the rod lens array as described thus far, the state of array of the lens elements is improved owing to flatness and smoothness of surfaces of the glass plates facing the lens elements, and resolution can be prevented from being lowered since flare beam transmitted through the glass plate (transmitted through the portion other than the lens elements) and going out from the beam-exit side can be reduce to a minimum by forming a reflection-preventing potion and by adjusting the thickness of the glass or forming beam-shielding zones.

Therefore, owing to the improvement in the accuracy of alignment of the lens elements described above, possibility of occurrence of variations in resolution of the rod lens array in the longitudinal direction can be reduced, and periodic variations in density is prevented from generated often even when a slight misalignment in the direction of the optical axis occurs or when half tone is treated.

What is claimed is:

1. A rod lens array in which a number of rod-shaped lens elements are arrayed in at least one row between two side plates, and clearances between the side plates and the lens elements are filled with resin to form a single integral unit, wherein:

the two side plates are formed of glass plates;

inner surfaces of these two glass plates facing the lens elements are flat and smooth; and outer surfaces on the opposite sides are formed with reflection-preventing portions.

2. The rod lens array according to claim 1, wherein side surfaces on the beam-exit sides of both of the glass plates are formed with beam-shielding zones extending inwardly from outer edges of the side surfaces and elongating almost the whole length along the row of the lens elements.

3. A rod lens array in which a number of rod-shaped lens elements are arrayed in at least one row between two side plates, and clearances between the side plates and the lens elements are filled with resin to form a single integral unit, wherein:

the two side plates are formed of glass plates;

inner surfaces of these two glass plates facing the lens elements are flat and smooth; and outer surfaces on the opposite sides are formed with reflection-preventing portions; and wherein the side surface on the beam-exit sides of both of the glass plates are formed with beam shielding zones extending inwardly from outer edges of the side surfaces and elongating almost the whole length along the row of the lens elements, and wherein the width of the beam-shielding zone Ts satisfies the following relation:

$$Tg > Ts \times Tg - Z \times D \times \{2 + \sqrt{3} \times (n-1)\} / \{2 \times (TC-Z)\}$$

where:
Tg: thickness of the glass plate

D: diameter of lens element
Z: length of lens element
TC: conjugate length
n: number of rows of lens elements.

4. A rod lens array in which a number of rod-shaped lens elements are arrayed in at least one row between two side plates, and clearances between the side plates and the lens elements are filled with resin to form a single integral unit, wherein:

the two side plates are formed of glass plates;

inner surfaces of these two glass plates facing the lens elements are flat and smooth; and outer surfaces on the opposite sides are formed with reflection-preventing portions; and wherein the thickness of both of the glass plates Tg satisfies the following relation:

$$Tg > Z \times D \times \{2+\sqrt{3} \times (n-1)\}/\{2 \times (TC-Z)\}$$

where:
D: diameter of lens element
Z: length of lens element
TC: conjugate length
n: number of rows of lens elements.

5. The rod lens array according to claim 1, wherein a reflection preventing portion of said reflection preventing portions formed on an outer surface of said outer surfaces of a glass plate of said glass plates includes at least one of an anti-reflection coating layer, a rough surface having fine pits and projections, and a refractive index matching portion.

6. A rod lens array mounting body comprising a combination of:

a rod lens array in which a number of rod-shaped lens elements are arrayed in at least one row between two side plates, and clearances between the side plates and the lens elements are filled with resin to form a single integral unit; and a holder member to be brought into contact with a side plate of said rod lens array, wherein:
the two side plates are formed of glass plates;
surfaces of the two glass plates facing the lens elements are flat and smooth; and
the portion where said glass plates and said holder member abut is formed with a reflection-preventing portion.

7. The rod lens array mounting body according to claim 6, wherein the side surfaces on the beam-exit sides of both of the glass plates are provided with beam-shielding zones extending inwardly from the outer edges of the side surfaces and elongating almost the whole length along the row of the lens element.

8. A rod lens array mounting body comprising a combination of:

a rod lens array in which a number of rod-shaped lens elements are arrayed in at least one row between two side plates, and clearances between the side plates and the lens elements are filled with resin to form a single integral unit; and a holder member to be brought into contact with a side plate of said rod lens array, wherein:
the two side plates are formed of glass plates;
surfaces of the two glass plates facing the lens elements are flat and smooth; and
the portion where said glass plates and said holder member abut is formed with a reflection-preventing portion, and
wherein the side surfaces on the beam-exit sides of both of the glass plates are provided with beam-shielding zones extending from the outer edges of the side surfaces and elongating almost the whole length along the row of the lens elements, and
wherein the width of the beam-shielding zone Ts satisfies the following relation:

$$Tg > Ts \times Tg - Z \times D \times \{2+\sqrt{3} \times (n-1)\}/\{2 \times (TC-Z)\}$$

where:
Tg: thickness of the glass plate
D: diameter of lens element
Z: length of lens element
TC: conjugate length
n: number of rows of lens elements.

9. A rod lens array mounting body comprising a combination of:

a rod lens array in which a number of rod-shaped lens elements are arrayed in at least one row between two side plates, and clearances between the side plates and the lens elements are filled with resin to form a single integral unit; and a holder member to be brought into contact with a side plate of said rod lens array, wherein:
the two side plates are formed of glass plates;
surfaces of the two glass plates facing the lens elements are flat and smooth; and
the portion where said glass plates and said holder member abut is formed with a reflection-preventing portion, and
wherein the width of the beam-shielding zone Ts satisfies the following relation:

$$Tg > Ts \times Tg - Z \times D \times \{2+\sqrt{3} \times (n-1)\}/\{2 \times (TC-Z)\}$$

where:
Tg: thickness of the glass plate
D: diameter of lens element
Z: length of lens element
TC: conjugate length
n: number of rows of lens elements.

* * * * *